United States Patent [19]
Campau

[11] Patent Number: 6,082,702
[45] Date of Patent: Jul. 4, 2000

[54] TUBING PINCH VALVE AND MOUNTING BRACKET ASSEMBLY

[75] Inventor: Daniel N. Campau, Grand Rapids, Mich.

[73] Assignee: Flow-Rite Control, Ltd., Grand Rapids, Mich.

[21] Appl. No.: 09/215,609

[22] Filed: Dec. 17, 1998

[51] Int. Cl.[7] ....................................................... F16K 7/04
[52] U.S. Cl. ................................... 251/8; 251/4; 251/143; 137/360
[58] Field of Search ............................... 251/8, 4, 7, 143; 137/343, 360

[56] References Cited

U.S. PATENT DOCUMENTS

| 5,031,658 | 7/1991 | Brattoli | 137/360 |
| 5,197,708 | 3/1993 | Campau | 251/8 |

*Primary Examiner*—Kevin Shaver
*Assistant Examiner*—David A. Bonderer
*Attorney, Agent, or Firm*—Niro, Scavone, Haller & Niro

[57] ABSTRACT

A tubing pinch valve and mounting bracket assembly is disclosed, the valve having a cylindrical valve body, and the bracket having a flexible base with two upstanding jaws. The valve body and each jaw have releasably engagable retention members, such that upon flexing of the base, the retention members may be disengaged to permit assembly or disassembly from the valve to the bracket.

7 Claims, 2 Drawing Sheets

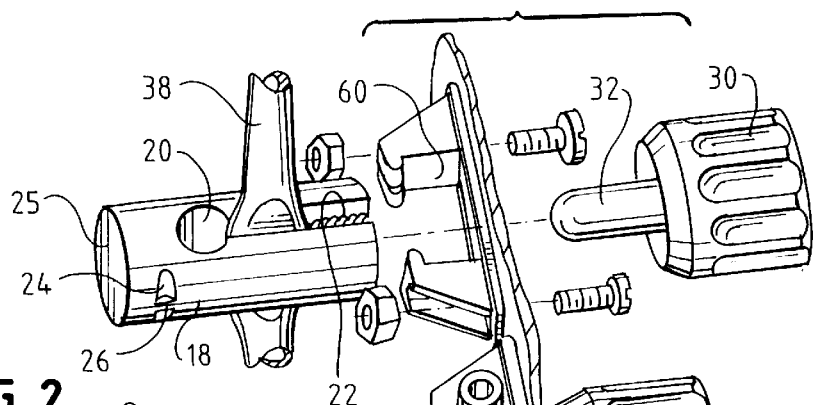
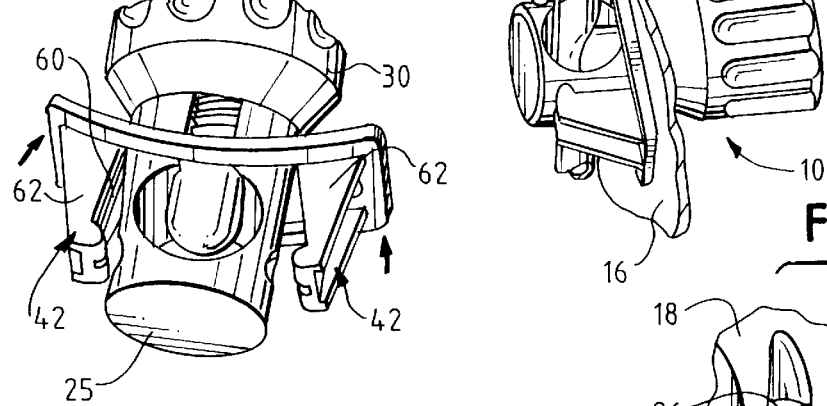
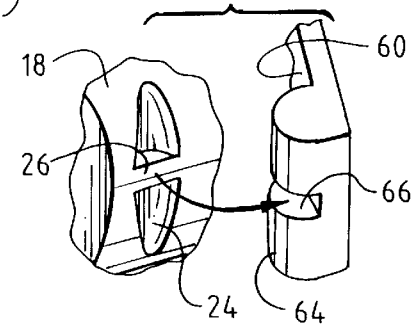
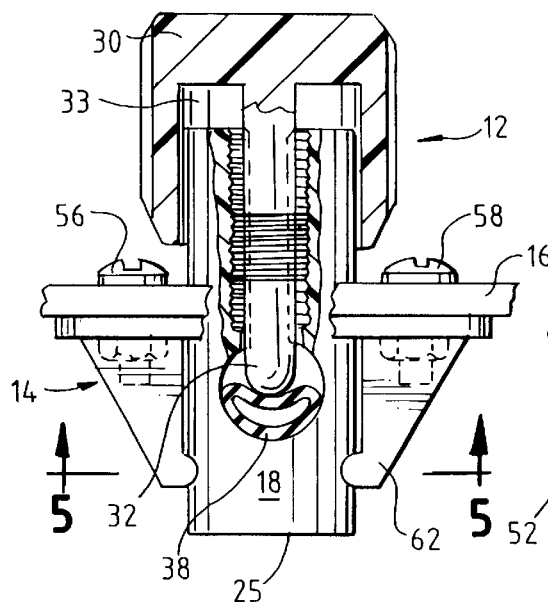
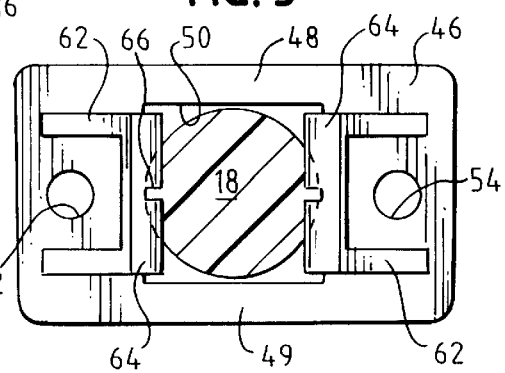

TUBING PINCH VALVE AND MOUNTING BRACKET ASSEMBLY

BACKGROUND OF THE INVENTION

The present invention relates generally to an appliance mounting device and, more particularly, to a tubing pinch valve and mounting bracket assembly.

A variety of small valves have been developed for controlling the flow of fluids through flexible tubing. One such valve is illustrated in U.S. Pat. No. 5,197,708. Although the tubing pinch valve disclosed in this patent has met with substantial commercial success, it suffers from the disadvantage that it can not be conveniently mounted. As a consequence, the valve is assembled to the tubing itself and typically requires two hands to be properly adjusted. In addition, separate brackets or fixtures are required to fix the position and orientation of the tube runs with which the valves are used. There exists, therefore, a need for a simple and convenient means for mounting such tubing pinch valves and other small manually manipulated appliances.

SUMMARY OF THE INVENTION

The present invention is directed to a tubing pinch valve and mounting bracket assembly that meets the aforementioned needs. The assembly is very simple and inexpensive, yet it provides effective mounting of the pinch valve and versatility in the orientation of the valve and tubing relative to the panel or other support surface to which the assembly is mounted.

In accordance with the present invention, the tubing pinch valve itself, has a cylindrical valve body with a tube receiving bore. The mounting bracket has a flexible base adapted for mounting onto any suitable support and a pair of jaws having a size and configuration for engagement with the valve body. The valve body and each of the jaws are provided with complimentary retention members that engage to prevent axial or rotational movement of the valve.

It is an object of the present invention, therefore, to provide a simple and inexpensive tubing pinch valve and mounting bracket assembly.

Another object of the invention is to provide versatility in the orientation of the valve and tubing relative to a mounting panel, thereby allowing the tubing to be positioned either in the front or rear of the mounting panel.

Another object of the invention is to provide a convenient mounting assembly for a tubing pinch valve so that the valve may be operated using only one hand.

Still another object of the present invention is to permit mounting of the pinch valve without the need for extensive redesign of the valve itself.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

FIG. 1 is a perspective view of a preferred panel-mount embodiment of the present invention showing various components of the invention in exploded form and as finally assembled;

FIG. 2 is another perspective view illustrating the manner of assembling and/or disassembling the valve to the mounting bracket in a panel-mount arrangement;

FIG. 3 is a partial cross-sectional view of the present invention illustrating the assembled valve and bracket mounted to a support and with the valve actuated to restrict fluid flow through a flexible tube;

FIG. 4 is an enlarged partial perspective view illustrating in greater detail the key and keyway configuration of one preferred embodiment;

FIG. 5 is a cross-sectional view taken along line 5—5 of FIG. 3;

DETAILED DESCRIPTION OF THE PREFERRED EMBODIMENTS

Figure 6:
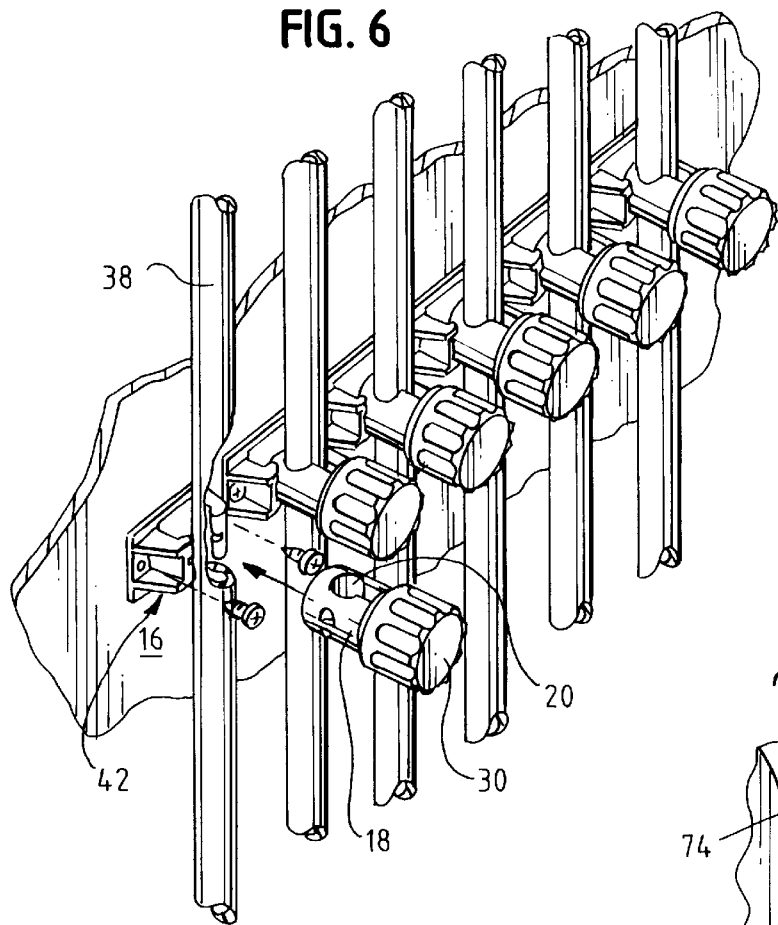
FIG. 6 is a perspective view illustrating a preferred base-mount embodiment with several valve and bracket assemblies joined in series.

As illustrated in the drawings and, more particularly, in FIG. 1, the present invention pertains to a tubing pinch valve and mounting bracket assembly designated generally as 10. The assembly includes both a tubing pinch valve 12 and a mounting bracket 14 designed to cooperate for mounting to any suitable support, such as panel 16. Although a variety of different tubing pinch valves may be employed in the present invention, the preferred valve is that described in U.S. Pat. No. 5,197,708, the disclosure of which is incorporated herein by reference.

Generally, the valve 12 includes a cylindrical valve body 18 having a bore or through hole 20 for receipt of the tubing and an internally threaded slot 22. Valve body 18 also includes diametrically opposed, generally tangential recesses 24, each of the recesses having a radially protruding key 26. The key 26 is preferably formed as an axially extending partition across the width of recess 24. As illustrated, the recesses 24 may be positioned adjacent the end 25 of valve body 18, though that position may be changed to accommodate specific applications.

The valve 12 also includes an integral knob and stem, 30 and 32 respectively. More particularly, the knob and stem are positioned concentrically, thereby forming an annular space 33. The valve stem 32 is provided with external threads that engage the internal threads on slot 22. As a result, by rotation of knob 30, the stem 32 is moved axially to adjust the cross-sectional flow area within flexible tubing 38 as illustrated in FIG. 3. Further details of the structure and operation of the valve, itself, may be found in U.S. Pat. No. 5,197,708.

Figure 7:
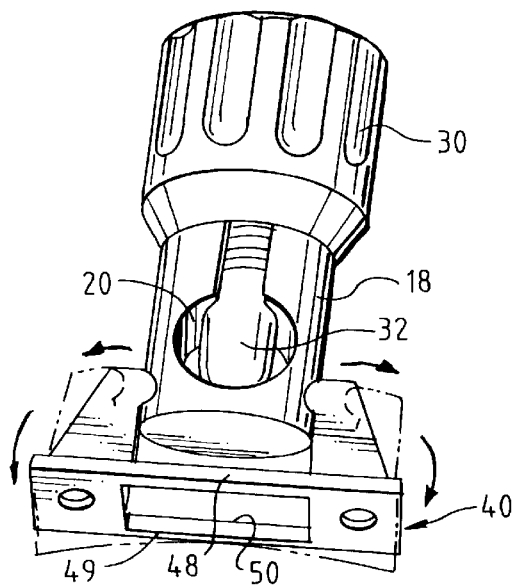
FIG. 7 is a perspective view, similar to that of FIG. 2, illustrating the manner of assembling and/or disassembling the valve to the mounting bracket in a base-mount arrangement.

With reference now to FIGS. 1–5 and 7, the embodiment illustrated includes a mounting bracket 14 comprised of a base 40 and a pair of upstanding jaws 42. The base 40 includes end panels 44 and 46 joined by flexible side rails 48 and 49, thereby defining a central aperture 50. End panels 44, 46 are provided with suitable mounting holes 52 and 54 to accommodate threaded fasteners 56 and 58 for firmly mounting the bracket to panel 16. Each of the jaws 42 includes an inner wall 60 and supporting strut walls 62, thereby rigidly joining the jaws to base 40. The jaws terminate with a pair of inwardly facing flanges 64, each having a keyway 66. The flanges 64 and keyways 66 are configured to engage the recesses 24 and keys 26 on valve body 12 when the jaws are parallel to one another. However, by flexing the base 40, as illustrated in FIGS. 2 and 7, the jaws are separated allowing disengagement of the flanges 64 and recesses 24. Of course, when the base 40 is locked down against its support surface, as illustrated in FIG. 3, the jaws remain in parallel alignment and the flanges remain in fixed engagement with the valve body recesses. Thus, the valve 12 position is fixed relative to the panel 16.

Figure 9:
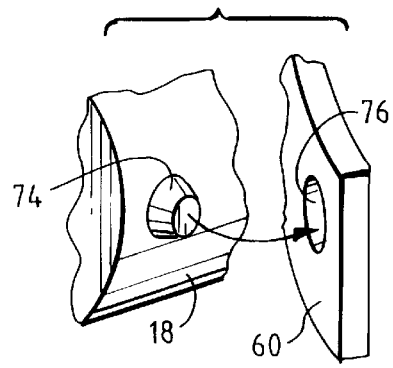
FIGS. 8 and 9 are also partial perspective views similar to FIG. 4, but showing alternative embodiments of the present invention.
Figure 8:
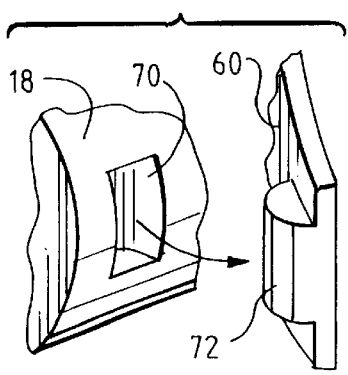

Those of skill in the art will appreciate that the jaws 42 need not employ the specific retention members illustrated in FIG. 4. Thus, alternative retention members, shown in FIGS. 8 and 9, may be found suitable. In FIG. 8, the valve body 18 is provided with a tangential recess 70, and the inner wall 60 of jaw 42 includes a complimentary flange 72. Likewise, in FIG. 9, the valve body 18 is provided with a radially extending protuberance 76 and inner wall 60 of jaw 42 has a complimentary aperture. In all of the illustrated embodiments, the retention member is capable of resisting both axial (pull out) and rotational (turning) forces typically applied to the valve in normal operation.

In the arrangement illustrated in FIGS. 1–3, the so-called panel-mount arrangement, the tubing 38 is disposed on one side of panel 16, whereas the valve actuation knob 30 is located on the opposite side of the panel. To accommodate this arrangement base aperture 50 must necessarily be sized to permit insertion of valve body 18. Once properly assembled, only the actuation knob is visible on the front of panel 16, providing a clean and uncluttered appearance.

FIGS. 6 and 7 illustrate another arrangement, namely the base-mount arrangement, in which the valve 12, mounting bracket 14 and tubing 38 are all located on the same side of the support surface or panel 16.

Thus, the present invention permits the same mounting bracket 14 to be used for both panel-mount and base-mount arrangements. To achieve this preferred versatility, the flanges 64 are located on the free end of inner walls 60 and spaced from base 40 a sufficient distance so that neither panel 16 nor base 40 interferes with tubing 38 disposed within bore 20.

Of course, the location of recesses 24 relative to bore 20 and the location of flanges 64 relative to bore 20 and the location of flanges 64 relative to base 40 may be selected to orient the bore 20, and thus tubing 38, in any of a variety of different positions relative to panel 16. Such modifications will be readily apparent to those of ordinary skill in the art.

The mounting bracket 14 may be constructed from many different materials well known to those of skill in the art. Particularly preferred materials are nylon or acetal polymers.

It will be appreciated by those skilled in the art that various changes and modifications can be made to the illustrated embodiments without departing from the spirit of the present invention. All such modifications and changes are intended to be covered by the appended claims.

I claim:

1. A tubing pinch valve and mounting bracket assembly comprising:

a cylindrical tubing pinch valve body;

a bracket brace having two end panels joined by opposing flexible side rails thereby defining a central aperture;

a pair of upstanding jaws rigidly joined to the base;

the valve body and each jaw having releasably engageable retention members; and wherein upon flexing of the bracket base, the tubing pinch valve may be assembled to or disassembled from the bracket.

2. The valve and bracket assembly of claim 1 wherein the base aperture is sized to permit passage of at least a portion of the valve body to thereby permit assembly of the valve body to the jaws by insertion through the bracket brace.

3. The valve and bracket assembly of claim 2 wherein said valve body includes diametrically opposed and generally tangential recesses and each jaw includes an inwardly extending flange.

4. The valve and bracket assembly of claim 3 wherein each tangential recess has a radially extending key and each flange has a keyway configured to receive one of the recess keys.

5. The valve and bracket assembly of claim 3 wherein the valve body has a tube receiving bore, and wherein the location of the valve body recesses relative to the bore and the location of the jaw flanges relative to the bracket brace permit positioning a tube within the bore on the side of the base from which the jaws extend.

6. The valve and bracket assembly of claim 4 wherein the keys are rails that extend across each valve body recess and the keyways are slots that extend across each jaw flange.

7. The valve and bracket assembly of claim 1 wherein the valve body houses a tube and the bracket base is adapted for mounting to a support having both front and rear surfaces, and wherein the valve body recesses and the bracket jaw flanges are arranged so that the valve and bracket may be assembled in at least two different orientations, one permitting actuation of the valve from the same side of the support on which the tube is located and the other permitting actuation of the valve from the side of the support opposite to that on which the tube is located.

* * * * *